May 4, 1965   R. B. FAULK   3,182,186
POLYHEDRAL DISPLAY DEVICES
Filed June 25, 1962   3 Sheets-Sheet 1

INVENTOR.
RAYMOND B. FAULK
BY
Hauke & Hauke
ATTORNEYS

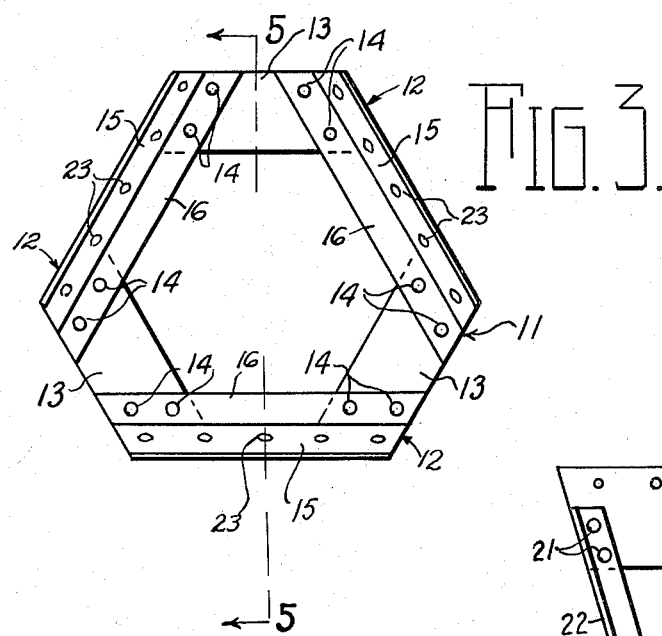
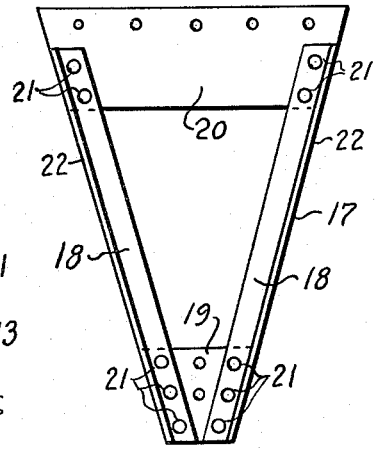
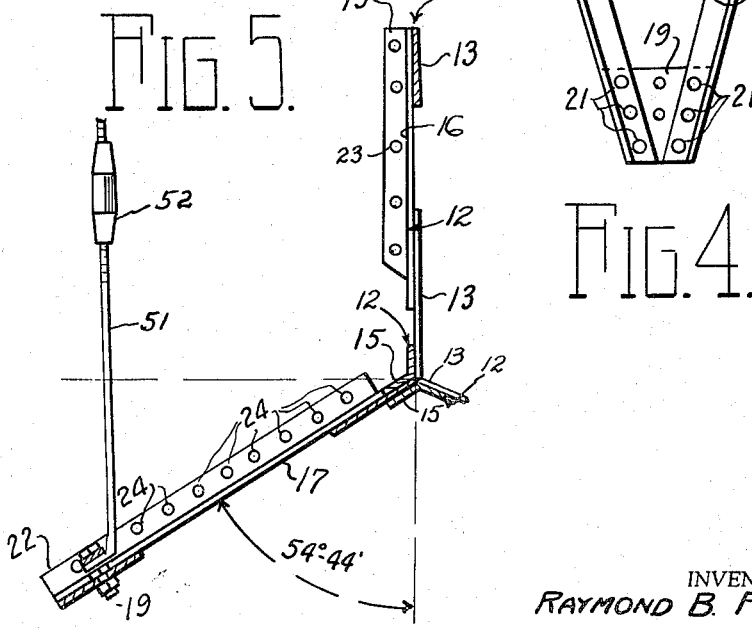

INVENTOR.
RAYMOND B. FAULK

United States Patent Office 3,182,186
Patented May 4, 1965

3,182,186
POLYHEDRAL DISPLAY DEVICES
Raymond B. Faulk, 8501 William St., Taylor, Mich.
Filed June 25, 1962, Ser. No. 204,978
13 Claims. (Cl. 240—10.1)

The present invention relates to illuminate polyhedric forms and more particularly to a construction for such a device especially suitable for display advertisement.

In my copending patent application, Ser. No. 717,179, filed Feb. 24, 1958, now Patent No. 3,048,694 and my issued U.S. Patent No. 2,966,757, new constructions of polyhedral forms suitable for decorative and advertising purposes are described. The constructions therein disclosed, although suitable for relatively small devices, are not satisfactory when quite large polyhedric forms are needed such as in outdoor display advertising.

It is an object of the present invention to provide a construction for polyhedral forms which enables the use of these devices in outdoor display advertising.

It is another object of the present invention to increase the effectiveness of such a device by providing means illuminating the peripheral edges of the assembled polyhedral form.

It is yet another object of the present invention to provide a novel means of presenting an advertising message by providing a polyhedral form carrying a message which can be read as the form is rotated.

It is a further object of the present invention to provide a readily assembled polyhedric form for outdoor advertising and the like by providing a construction for such a device utilizing interchangeable members.

It is still another object of the present invention to provide an improved advertising device by providing a polyhedric form constructed to provide a protected space for transformers and the like and which is capable of being constructed in a variety of different forms.

Other objects and advantages will readily occur to one skilled in the art to which the invention pertains upon reference to the following drawings in which like reference characters refer to like parts throughout the several views and in which FIG. 1 is an elevational view of a preferred embodiment of the present invention.

FIG. 3 is an enlarged fragmentary view of a portion of the structure shown in FIG. 1, and illustrating a base member of the present invention.

FIG. 4 is an elevational view of a preferred planar member of the present invention.

FIG. 5 is a cross sectional view taken substantially on line 5—5 of FIG. 3 and

As is well known to one familiar with geometry a regular octahedron consists of eight congruent triangular base members joined at their edges to form a three dimensional form having eight planar surfaces and twelve edges. A preferred embodiment of the present invention as will be more apparent as the description proceeds provides a display device comprising a casing constructed substantially in the form of an octahedron and in which extending substantially planar members are provided at each of the twelve edges of the octahedron casing extending outwardly therefrom.

Figure 6:
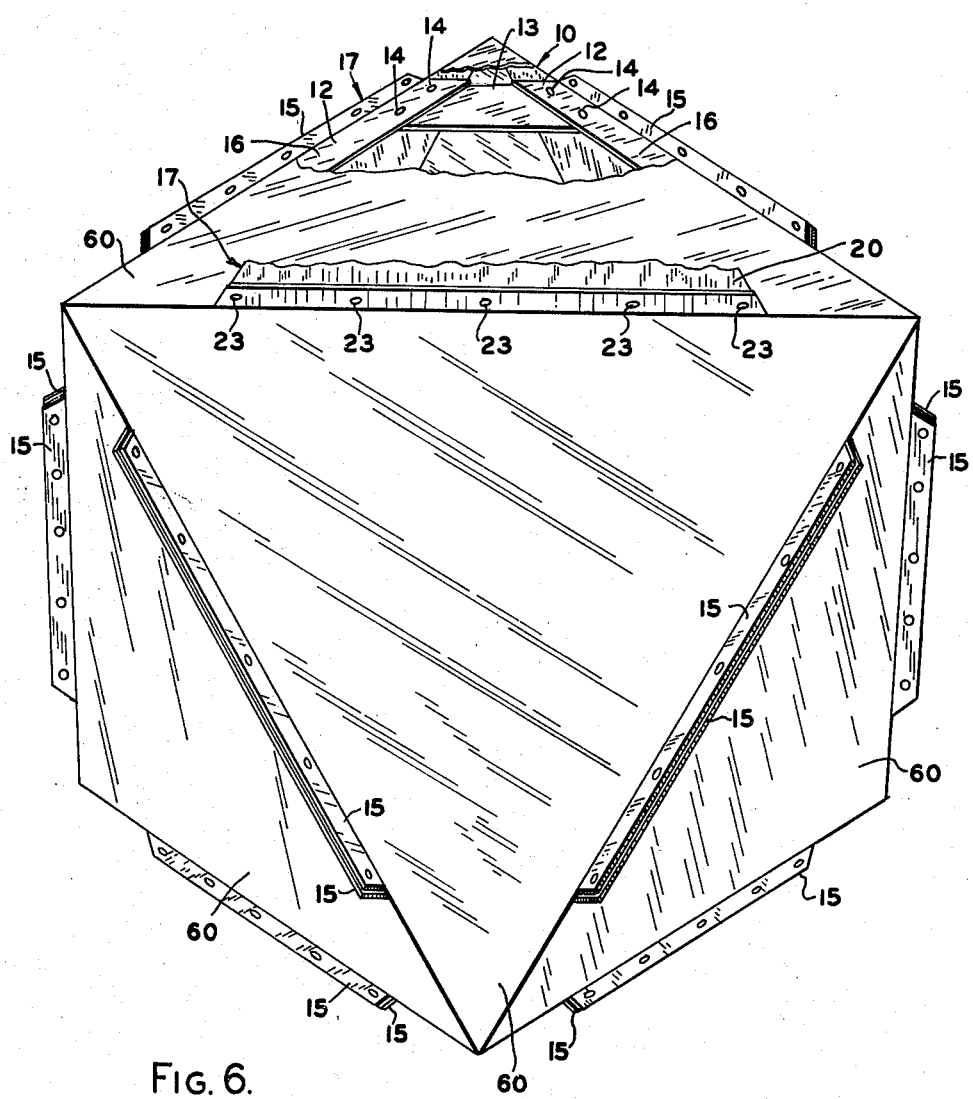
FIG. 6 is a perspective view of a casing of the present invention with portions only of some of the planar members shown for purposes of clarity.

Now referring to the drawings for a more detailed description of the present invention, a preferred device is shown as comprising a casing 10 as can be best seen in FIG. 6 preferably forming a regular octahedron made up of eight similar base members 11. The base member 11 as can best be seen in FIGS. 3 and 5 and 6 are each preferably constructed of straight structural members 12 connected by corner plates 13. The corner plates 13 may be welded or otherwise secured to the structural members 12 as at 14. Each of the structural members 12 is provided with outwardly extending flanges 15 at those edges which make up the edges of the octahedro casing 10. In the preferred embodiment illustrated each flange 15 forms a dihedral angle of 54°44' with the plane of the base surface 16 of the structural member 12. When the base members 11 are assembled to form the casing 10 the flanges 15 of adjoining structural members 12 provide the means by which outwardly extending planar members 17 are carried. This can best be seen in FIG. 5. For convenience the base members 11 are preferably in the form of triangles with the corner portions removed as shown although it is apparent that in constructing the base members 11 they could be in the form of true triangles as well.

The planar members 17 are in the present showing preferably substantially triangular and comprise a pair of structural members 18 joined at their apex by a corner plate 19. A plate 20 forms the base of the triangle. The structural members 18 and the plates 19–20 are secured together in any convenient manner as by welding at 21. The structural members 18 are preferably provided with normally disposed longitudinally extending flanges 22. The plate 20 is carried intermediate the pair of closely adjacent substantially parallel flanges 15 of adjacent base members 11 by any means such as welding through the perforations 23 and in this way the base members 11 and the planar member 17 are secured together to form the device of the present invention. Each pair of closely adjacent flanges 15 of the base members 11 carries at least one planar member 17.

The flanges 22 of the structural members 18 are provided with a plurality of perforations 24 which provide the means by which insulated fasteners 25 are carried. The insulated fasteners 25 carry a neon illuminating member 26 in a position spaced from the periphery of the planar member 17.

It is apparent that panel members 60 as shown in FIG. 6 may be provided to be bolted or otherwise secured to the base members 11 to enclose the casing 10. This provides a convenient space in which transformers and other electrical equipment for the neon members 26 may be housed. The panel members may be each provided with a letter which will spell out an advertising message as the device is rotated.

Figure 1:
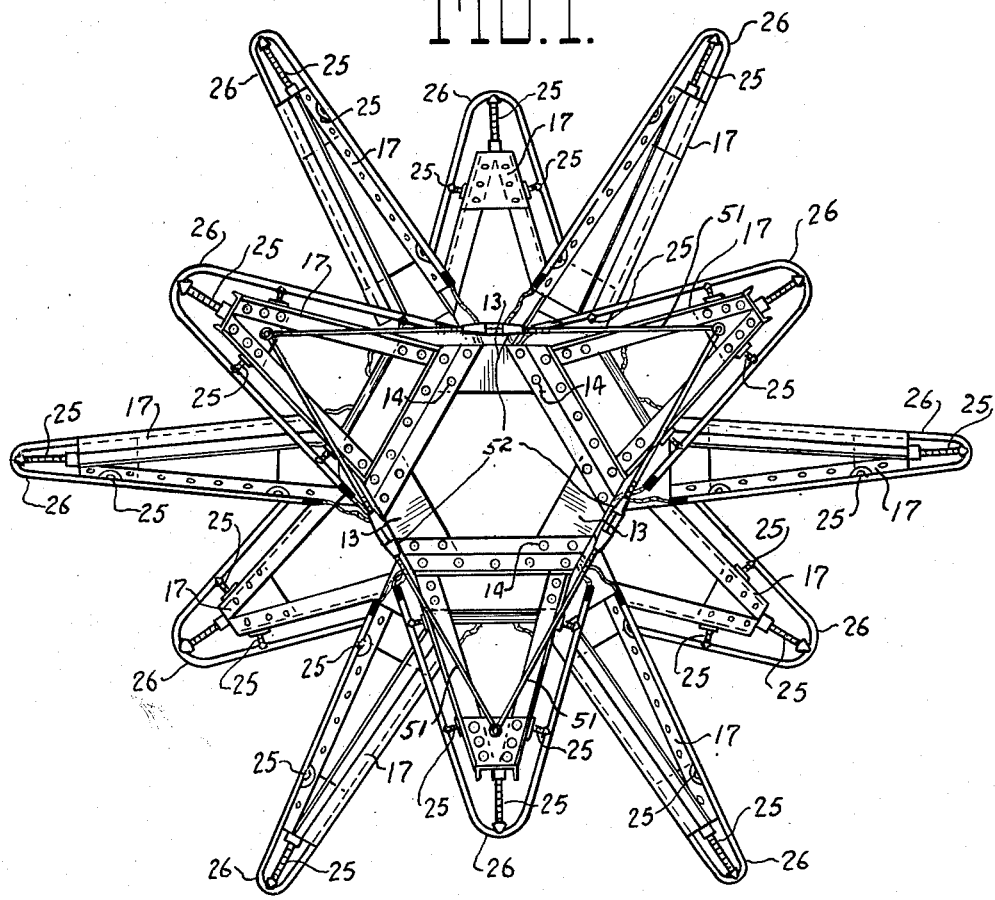

As shown in FIGS. 1 and 5, tension support tie rods 51 are preferably bolted to the corner plates 19 of pairs of planar members 17 to provide additional support without interfering with the interior space of the casing or parts projecting therefrom. The tie rods 51 are preferably provided with conventional turnbuckle means 52 for adjusting the tension on the rods 51. In FIG. 1, only the front facing portion is provided with the rods for clarity but in practice, similar elements would tie all the members together.

Figure 2:
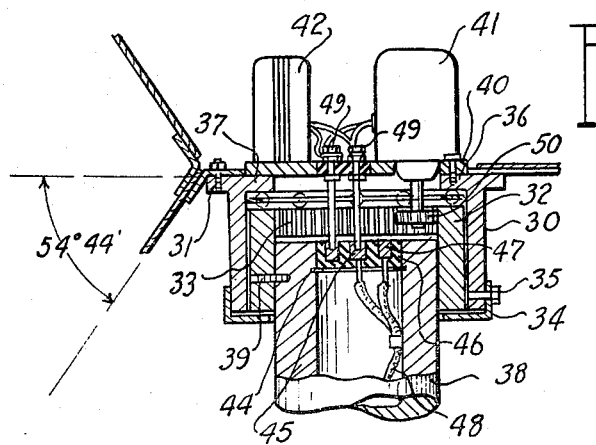
FIG. 2 is a view in cross section illustrating a preferred rotating means for the polyhedric form shown in FIG. 1.

FIG. 2 illustrates a preferred means for rotating the device as comprising a cylinder 30 bolted as at 31 or otherwise secured to one of the base members 11. A sleeve 32 having an internally geared portion 33 is retained in the cylinder 30 by an annular flange 34 bolted to the cylinder 30 as at 35. An annular bearing member 36 is provided intermediate one end of the sleeve 32 and a flanged portion 37 of the cylinder 30. A hollow post 38 is carried in the sleeve 32 and is secured thereto by any means such as bolts 39. The base member 11 also carries a plate 40 which provides the means by which an electric motor 41 and a transformer 42 are carried in the casing 10. An insulated cylindrical member 46 is carried in the hollow post 38 by a retaining ring 44. The member 46 is provided with a recess 45 and an annular recess 47 each of which are filled with mercury. Electrical leads 48 are carried in the post 38 and are connected to the mercury filled recesses 45 and 47. The transformer 42 and motor 41 are electrically connected to stationary terminal posts 49 which have an end portion positioned in the mercury. The motor 41 is provided with a geared shaft 50 which is drivingly connected to the geared portion 33 of the sleeve 32.

As is apparent from the FIG. 2, the electrical motor 41 may be actuated to revolve the device through the gears 50 and 33. The necessary electrical contact is maintained during rotation since the stationary posts 49 will rotate in the mercury filled recesses 45 and 47.

Although a preferred device has been described having an octahedral casing 10, it is apparent that the casing 10 may be of other polyhedral forms either regular or irregular. The planar members 17 preferably extend well beyond the edges of the casing 10 and although the planar members 17 have been described as being substantially triangular, they may be of any other desired shape as well.

It is apparent from the foregoing description that the present invention provides a construction which permits large polyhedral display devices to be used for outdoor advertising.

It is also apparent that although I have described but one embodiment of the present invention, modifications and changes can be made without departing from the spirit of the invention or the scope of the appended claims.

I claim:
1. An article of manufacture comprising
   (a) a plurality of polygonal base members assembled to form a polyhedral casing,
   (b) each of said base members comprising a plurality of flanged structural members connected together with their flanges extending outwardly,
   (c) the flange of each of said structural members being closely adjacent and in a plane substantially parallel to the flange of a structural member of an adjoining base member,
   (d) a substantially planar member positioned intermediate each pair of adjacent flanges and extending outwardly therefrom and means securing said planar member to said flanges whereby said base members are secured together to form a polyhedral casing and said planar members extend outwardly from each edge of said polyhedral casing, and
   (e) illuminating means carried on the periphery of each of said planar members.
2. The article as defined in claim 1 and in which said illuminating means comprises,
   (a) insulating members carried at spaced portions on the periphery of each of said planar members, and
   (b) a neon tubular lighting member carried on said insulating members.
3. The article as defined in claim 1 and in which said base members are substantially triangular.
4. The article as defined in claim 1 and in which said base members include panel members carried by said structural members whereby said assembled base members form an enclosed hollow polyhedral casing.
5. The article as defined in claim 1 and including means selectively operable to rotate said polyhedral casing.
6. The article as defined in claim 2 and in which said planar members comprise a plurality of structural members connected to form a planar geometric figure.
7. The article as defined in claim 6 and in which said planar members are substantially triangular.
8. An article of manufacture comprising,
   (a) a plurality of polygonal base members assembled to form a polyhedral casing,
   (b) each of said base members having a peripheral flange,
   (c) a portion of the flange of each of said base members being closely adjacent and in a plane substantially parallel to a portion of the flange of an adjoining base member,
   (d) a substantially planar member secured to said adjacent flanges and extending outwardly therefrom whereby said base members and said planar members are secured to one another to form a polyhedral casing having planar members extending from each edge thereof, and
   (e) illuminating means carried on the periphery of each of said planar members.
9. The article as defined in claim 8 and including tie rods connecting said planar members.
10. A display device comprising
    (a) eight substantially triangular and similar base members each provided with a peripheral flange portion,
    (b) means securing said base members one to the other to form an octahedral casing having twelve edges,
    (c) said means comprising a planar member positioned intermediate the adjacent flange portions of said base members at each of said twelve edges and extending outwardly therefrom and means securing said adjacent flange portions to said planar members, and,
    (d) illuminating means carried on the periphery of each of said planar members.
11. The device as defined in claim 10 and in which each of said planar members are substantially triangular in form.
12. The device as defined in claim 10 and in which each of said base members is constructed of flanged structural members.
13. The device as defined in claim 10 and including panel members secured to said base members to close said octahedral casing.

References Cited by the Examiner
UNITED STATES PATENTS

| | | | |
|---|---|---|---|
| 2,228,437 | 1/41 | Blana | 240—10.1 |
| 2,244,206 | 6/41 | Longley | 240—10.1 |
| 2,281,790 | 5/42 | Newhall | 240—10.1 |
| 2,894,345 | 7/59 | Bushnell | 240—10 X |

NORTON ANSHER, *Primary Examiner.*